Oct. 31, 1950 R. J. IMBERT 2,527,732
BRAKING DEVICE FOR AIRCRAFT JET TURBO-PROPELLERS
Filed Jan. 14, 1947 2 Sheets-Sheet 1
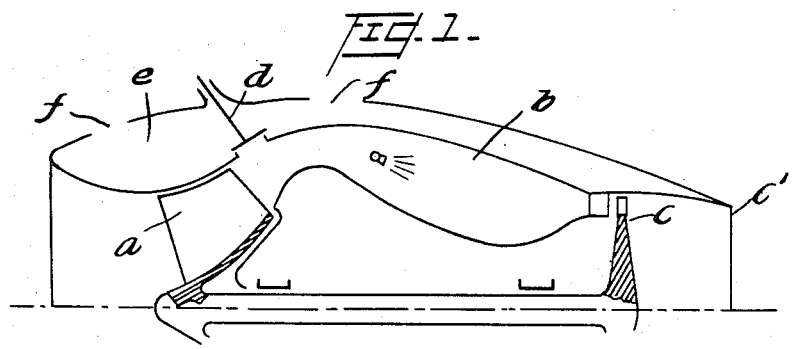
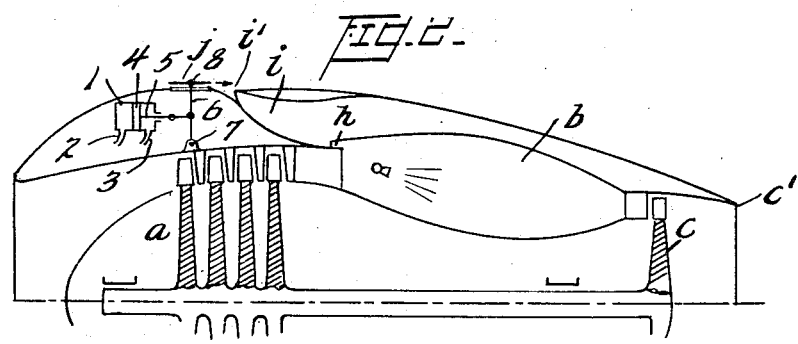
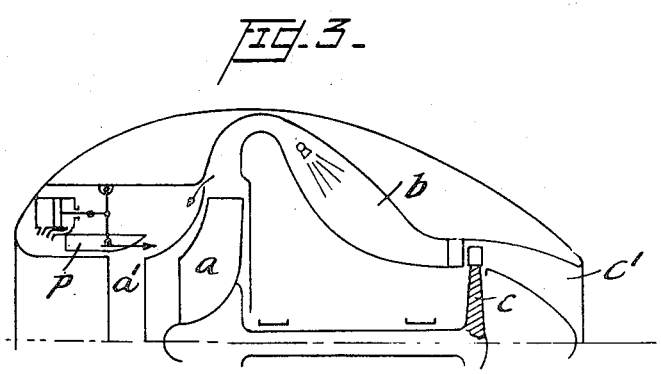
INVENTOR.
Roger Jean Imbert
BY
Watson, Cole, Grindle & Watson
Attorneys

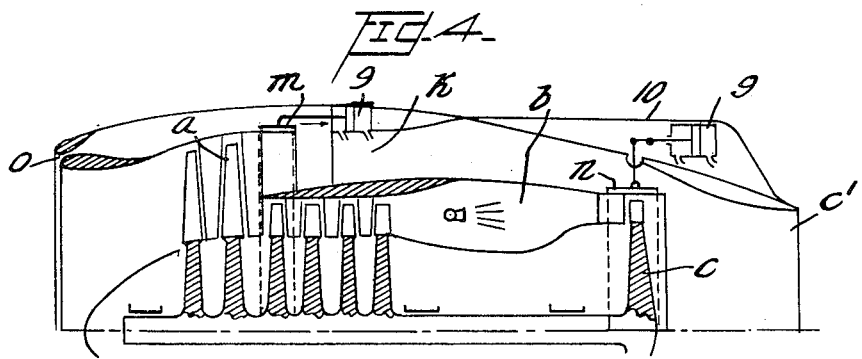
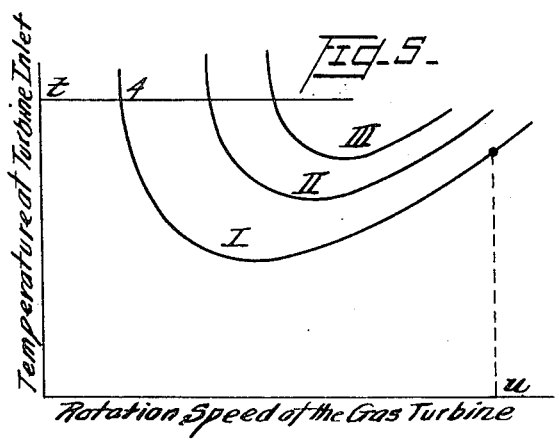
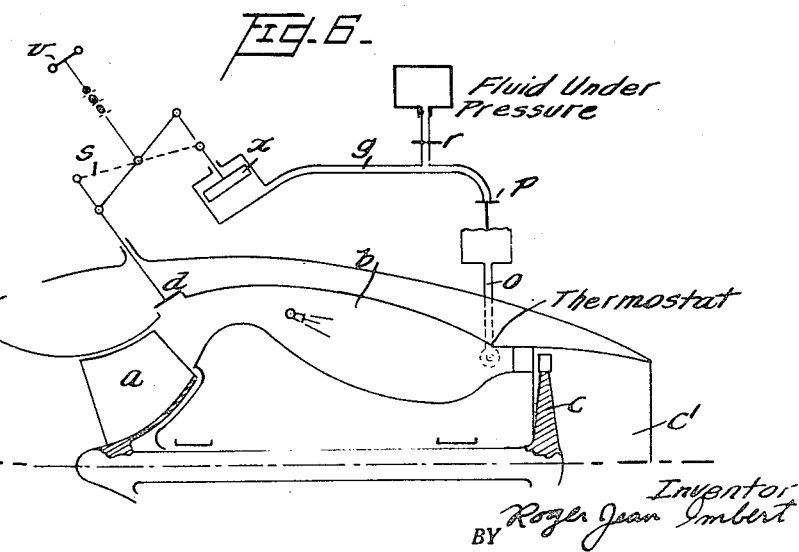

Patented Oct. 31, 1950

2,527,732

UNITED STATES PATENT OFFICE 2,527,732

BRAKING DEVICE FOR AIRCRAFT JET TURBOPROPELLERS

Roger Jean Imbert, Paris, France, assignor to Societe Rateau (Societe Anonyme), Paris, France, a company of France, and Rene Anxionnaz, Paris, France Application January 14, 1947, Serial No. 722,032
In France February 7, 1946

4 Claims. (Cl. 60—35.6)

It is known that when the engine actuating a screw-propeller aircraft is idled upon landing, the aircraft is actually braked as the screw propeller works as a receptive turbine; on the other hand a pick-up of the engine for landing is still possible.

In the case of jet turbopropellers, low speeds only bring a slight brakage, and a pick up is relatively more difficult.

It is an object of this invention to do away with these difficulties. According to this invention, with a jet turbopropeller, compressed air is discharged to open air before and instead of being admitted to the reaction jet nozzle.

The following description with reference to the appended drawing given solely by way of example, will show how this invention may be carried out.

Fig. 1 represents a schematic axial semi-section of a device allowing to set apart and to discharge to open air a portion of the flow of compressed air.

Fig. 2 likewise shows a device allowing to discharge the air in a determined direction and Fig. 3 to discharge it into the suction pipe of the compressor.

Fig. 4 concerns the case of a dilution turboreactor in which air is taken from the dilution flow, while discharge is effected rearwardly with respect to the direction of movement of the aircraft.

Figure 5 is a diagram showing the variations of temperature, at the admission to a gas turbine for difficult rates of air amount.

Figure 6 is a schematic axial semi-section of a jet propeller embodying an automatic device for regulating the temperature at the admission to the gas turbine.

Let us consider, for instance (Fig. 1), a jet propeller comprising the wheel $a$ of an air compressor, a combustion chamber $b$, and an expansion turbine $c$ driving the compressor and a reaction jet nozzle $c_1$. A valve $d$ is arranged on the delivery side of the compressor and is actuated in any suitable manner, for example by hand for discharging air delivered by the compressor into a chamber $e$ and thence to atmosphere through apertures $f$, when said valve is open.

The discharge of a part of the compressed air flow before its passage into the combustion chamber, whatever may be the direction of discharge, already allows to get a part of the effect which is desired because the output of gases flowing through the jet nozzle $c_1$ and consequently the propelling thrust are diminished, so that the drag which becomes greater than the remaining thrust produces a braking effect. On the other hand, we can get, as soon as the takeaway is suppressed, more power from the turbine without an increase of the power absorbed by the compressor and by the same amount. Thus, we dispose of a possibility of accelerating the group.

According to a second feature of the invention, a well determined direction is given to the discharged air flow and particularly in the direction opposite to the advance; it is easy to show, by using the momentum theorem as applied to the direction of motion, that we get an important braking effect.

Fig. 2 shows as a non-limitative example, an embodiment of this braking device. A circular slot or separate slots $h$ place the delivery side of the air compressor in communication with a chamber $i$. The discharge of air forwardly, that is to say in the direction opposite to the movement of the aircraft, is effected by slots $i_1$, provided for this very purpose in the outer wall of the propeller, and shut or opened by a control ring $j$. To this end said ring $j$ is movable in translation on the outer wall of the propeller.

The control device for the valve ring $j$ has been illustrated diagrammatically as comprising a hydraulic cylinder $l$ to and from which liquid pressure is supplied and released through pipes 2, 3, the cylinder $l$ containing a piston 4 the rod 5 of which is coupled with a lever 6 pivoted at 7 and connected at 8 with valve ring $j$. The air so taken on the delivery side of the compressor may also be passed, as shown on Fig. 3, into the suction pipe of the compressor, when we open a valve-shutter $p$ (by means of a control device of the same type as shown on Fig. 2).

Of course, the form of the slots or discharge holes, their number and their distribution on the front of the reaction, the manner of controlling the valve-shutters may be of any type as far as the expansion of the air deducted at the end of the compression is done with minimum losses and in the direction opposite to the movement of the aircraft.

In case of dilution turbo-reactors in which only a part of the compressed air participates in the cycle of the gas-turbine, the dilution flow may be wholly or partly discharged in the direction opposite to the movement of the aircraft.

Fig. 4 shows, as an example, an embodiment of this particular form of the invention. In normal working conditions, the dilution flow $k$ joins the flow of exhaust gas from the turbine only downstream with respect to the turbine and little before the reaction jet nozzle $c_1$. When it is wanted to get a braking effect while landing or diving, the two shutting cylinders $m$ and $n$ are simultaneously displaced in order that the cylinder $n$ shuts the normal circuit towards the nozzle $c_1$ and that the cylinder $m$ open the slots, allowing the dilution flow to be discharged towards the front through holes or nozzles $0$. On this figure the exhaust-ports are shown substantially in the same line of impact which represents approximately the delimitations between the incoming and outcoming air flows.

Any other equivalent discharge device, similar for instance to those above described may also be provided. A control device generally denoted by character 9 is illustrated; this control device can be of the type already described with reference to Fig. 1 for the control of the ring member $j$. A similar device may be used to control cylinder $m$; device 9 is concealed in a fairing $10$.

It is known that the temperature of the gas at the admission of the turbine, except at very low rotation speeds is less for low speeds than for normal speeds. Fig. 5 shows the variations of temperature at the admission to the turbine for different rates of air discharge. In this diagram the X-axis represents the rotation speed $u$ of the turbo-reactor and the Y-axis the temperature at the turbine inlet. The curve I gives the low of variation of this temperature in function of the speed $u$ on the absence of any discharge, the curve II for a discharge of 15% for example, and the curve III for discharge of 30%. Therefore we can admit a limit curve of temperature such as 4, the intersections of which with curves II and III, for example, determine, for a given rate of evacuation of the air, the lowest speeds which can be performed.

When a discharge of air is effected after compression, we must necessarily increase the temperature at a point up-stream with respect to the turbine to get a balance between the power absorbed by the compressor and the power given by the turbine. By fixing the temperature of the gas, before the turbine, at a maximum admissible value herein above defined, we then shall have the means to limit the air-discharge at low speeds by acting through a thermostat or any other equivalent device, on the maximum opening of the discharge slots. It will be so when landing for example, and due to the fact that the temperature of the gas is greater at the admission in the turbine, we shall have, as soon as the slots are closed, an excess of energy favorable to pick up if necessary.

Fig. 6 illustrates, as an unrestrictive example, means for controlling the air discharge whereby the limit temperature at the turbine inlet is not exceeded. A thermostat $o$, working by steam pressure, the bulb of which is set at the inlet of the turbine, controls through a valve $p$ the outlet of a circuit $q$ of a motive fluid under pressure the incoming of which is limited by a restriction $r$. On the other hand, the exhaust valve $d$ can be opened by a rocking-lever $s$ controlled by a hand-wheel $v$ and by a piston $x$ receiving the pressure of the motive fluid. The operation of the device is as follows: if following the hand opening of the discharge valve $d$, the temperature reaches an excessive value at the inlet to the turbine, the thermostat $o$ causes shutting of the discharge of the motive fluid by the valve $p$, whence, an increase of pressure under piston $x$ and, through the rocking-lever $s$, the shutting of valve $d$ up to the admissible value.

What I claim is:

1. In a jet turbo-propeller system, the combination of a rear gas turbine; combustion means for generating hot gas, connections to feed said turbine for operating the same; front means coupled with said turbine so as to be driven therefrom for compressing air, connections to deliver part of compressed air to said combustion means; adjustable means, providing a passageway from said compressing means to discharge the remainder of said compressed air at the rear of said turbine; and second adjustable means extending from the first adjustable means in a generally forward direction, for venting at least a portion of said air remainder to atmosphere.

2. In a jet turbo-propeller, the combination of a rear gas turbine; combustion means for generating hot gas, connections to feed said turbine for operating the same; front means coupled with said turbine so as to be driven therefrom, for compressing air, connections to deliver a part of said compressed air to said combustion means; means providing two exits for the remainder of said compressed air, one exit discharging at the rear of said gas turbine while the other exit discharges forwardly; and controllable means for shutting either one of said exits.

3. In a reaction jet propeller of the type comprising a reaction jet nozzle adapted for directing rearwardly a propelling jet, air compressing means, a power combustion engine for driving the said compressing means, means for delivering to said nozzle through said combustion engine a part only of the air under pressure generated by said air compressing means, and a bypass leading the other part of the air under pressure to said jet reaction nozzle outside said combustion engine; the combination of nozzle means connected to said by-pass and adapted for discharging forwardly a braking jet of air under pressure taken from said by-pass, and of valve means for controlling the connection between said nozzle means and said by-pass.

4. In a reaction jet propeller of the type comprising a reaction jet nozzle adapted for directing rearwardly a propelling jet, air compressing means, a power combustion engine for driving the said compressing means, means for delivering to said nozzle through said combustion engine a part only of the air under pressure generated by said air compressing means, and a bypass leading the other part of the air under pressure to said jet reaction nozzle outside said combustion engine; the combination of nozzle means connected to said by-pass and adapted for discharging forwardly a braking jet of air under pressure taken from said by-pass, of valve means for controlling the connection between said nozzle means and said by-pass, and of other valve means arranged in said by-pass between the first named valve means and the reaction jet nozzle for controlling the output of air flowing to said reaction jet nozzle.

ROGER JEAN IMBERT.

REFERENCES CITED

The following references are of record in the file of this patent:

UNITED STATES PATENTS

| Number | Name | Date |
|---|---|---|
| 2,131,781 | Lysholm | Oct. 4, 1938 |
| 2,280,835 | Lysholm | Apr. 28, 1942 |
| 2,305,311 | Jendrassik | Dec. 15, 1942 |
| 2,409,177 | Allen et al. | Oct. 15, 1946 |